3,458,555
PRODUCTION OF AMINO-ORGANO-
FLUOROSILICATES
Christian Dathe and Richard Müllier, Radebeul, Germany, assignors to Institut fur Silikon- und Fluorkarbon-Chemie, Radebeul, Germany
No Drawing. Filed Aug. 17, 1966, Ser. No. 572,890
Int. Cl. C07f 7/12, 7/10
U.S. Cl. 260—448.2                                    9 Claims

ABSTRACT OF THE DISCLOSURE

Amino-organofluorosilicates of the formula $$NH_2(CH_2)_nSiF_3 \cdot xHF, \quad NH_2(CH_2)_nNH(CH_2)_mSiF_3 \cdot yHF$$

or $$NH_2(CH_2)_nNH(CH_2)_mNH(CH_2)_rSiF_3 \cdot yHF$$

wherein $n$, $m$, $r$ are integers from 1 to 6, $x=1$, and $y=2$, and process for making the same by reacting amino-organotrifluorosilanes with the stoichiometric amount of hydrofluoric acid at temperatures ranging from zero °C. to about 90° C. The products are used for incorporating organyl groups in the production of aminoalkylmetal compounds.

---

The present invention relates to the preparation of amino-organofluorosilicates.

It is already known to prepare organofluorosilicates of the general formula $Me_2[RSiF_5]$ by reacting organotrifluorosilanes of the formula $RSF_3$ with solutions or suspensions of fluorides, for instance, ammonium fluoride or potassium fluoride, whereby the alkali metal fluoride is added to form a complex salt with the trifluorosilane.

In the above formula, R stands for alkyl groups $$C_nH_{2n+}((n=1-18)$$

cycloalkyls $C_nH_{2n-1}(n=3-7)$, alkenyls $C_nH_{2n-1}(n=2-8)$ or $C_nH_{2n-3}(n=4-6)$, cycloalkenyls $C_nH_{2n-3}(n=4-8)$. R may also represent aryl of the formula $C_nH_{n-1}(n=5-7)$ or such compounds in which hydrogens linked to carbon are replaced by halogen, OH—, $SO_3H$—, or $NO_2$, or in which the carbons of the chain are linked by ether or thioether bonds. In the formula, Me stands for ammonium, organoammonium, lithium, sodium, potassium, rubidium, or cesium. As suitable solvents, in which the reaction can be carried out, we name: water, methanol, and ethanol.

It is, however, a shortcoming of the so obtained organofluorosilicates that they are subject to hydrolyzation in water after a short while; in acids or alkaline solutions they decompose at once. In aqueous hydrofluoric acid decomposition occurs with re-formation of trifluorosilane. Thus, for instance, methyl-, ethyl-, and propyl-pentafluorosilicates form methyl-, ethyl- and propyl-trifluorosilane, respectively. In other cases, even the Si—C bond is split, whereby the respective hydrocarbons are set free. Thus, ammonium-phenylpentafluorosilicate is converted to benzene with acids, while ammonium-n-propenylpentafluorosilicate will become propene.

It is the object of the present invention to overcome the above-mentioned shortcoming and to prepare aminoorganofluorosilicates of higher stability, to water as well as to acids and alkaline solutions.

It has now been found quite unexpectedly that such organopentafluorosilicates of the desired stability can be obtained by reacting organotrifluorosilanes, which contain amino groups in the organic radical, with aqueous hydrofluoric acid. The latter is added to the aminotrifluorosilane. The reactions proceed as follows:

$$NH_2(CH_2)_nSiF_3 + xHF \rightarrow NH_2(CH_2)_nSiF_3 \cdot xHF$$

$$NH_2(CH_2)_nNH(CH_2)_mSiF_3 + yHF \rightarrow$$
$$NH_2(CH_2)_nNH(CH_2)_mSiF_3 \cdot yHF$$

and $$NH_2(CH_2)_nNH(CH_2)_mNH(CH_2)_rSiF_3 + yHF \rightarrow$$
$$NH_2(CH_2)_nNH(CH_2)_mNH_2(CH_2)_rSiF_3 \cdot yHF$$

wherein $n$, $m$ and $r$ are integers from 1–6, $x=1$ and $y=2$.

The remarkable stabilization of the products so obtained is due to the formation of ammonium groupings and probably to the formation of internal complexes having a structure somewhat like $$\overset{(+)}{NH_3}(CH_2)_3SiF_4{}^{(-)}$$

The aminoorganyl radical is at the same time the cation. It is assumed that a hybrid ion is present containing in the molecule at separate places centers of positive and negative charge, for example $$NH_2CH_2CH_2CH_2SiF_3 \cdot HF \rightleftharpoons \overset{(+)}{NH_3}CH_2CH_2CH_2SiF_4{}^{(-)}$$

The salts are precipitated from their solutions in stable form which will not be decomposed by water, excess hydrofluoric acid, HCl or $HNO_3$, or ammonia; dilute sodium hydroxide solution attacks the compounds slowly.

The reaction according to the invention is carried out by adding to the aminoorganofluorosilanes hydrofluoric acid in stoiciometric amounts or in excess; the medium may be an aqueous or alcoholic solution in concentrations of hydrofluoric acid from 2–80% by weight. The temperatures are from 0° C. to about 90° C.; preferably from 10° C. to 30° C.

As shown in the above formulas, instead of the simple aminoorganotrifluorosilanes, such as $NH_2(CH_2)_3SiF_3$, such aminoorganotrifluorosilanes may be used which are substituted on N by alkyl radicals or such with several amino groups in the organic radical. Furthermore, instead of aminoorganotrifluorosilanes proper, such compounds may be used which, as triethoxy- or chlorosilanes, will be converted to the respective fluorosilanes when treated with hydrofluoric acid. In that case, the silane can be reacted in a single operation to obtain the desired end product, by carrying out the reaction with at least 3% by weight excess hydrofluoric acid as compared to the stoichiometric amount, and in concentrations of more than 5% by weight.

The products prepared according to the invention are useful agents for incorporating organyl groups, i.e. alkyl, and the like, in cases where other methods are difficult to apply for obtaining aminoalkylmetal compounds.

In the following, the invention will be more fully described in a number of examples, but it should be understood that these examples are only given by way of illustration and not of limitation.

Example 1

26 g. pure γ-diaminoethylene-propyltriethoxysilane $$H_2N—CH_2—CH_2—NH—CH_2—$$
$$CH_2—CH_2—Si(OC_2H_5)_3$$

are added drop by drop into a pre-cooled mixture of 28 g. 40% by weight hydrofluoric acid and 28 g. alcohol (ethanol of 96%) which had been vigorously stirred; the mash so formed is diluted by adding 50 cc. alcohol, and the precipitated salt subjected to suction filtration. Obtained are 21.5 g. (95%) γ-diaminoethylene-propyl-trifluorosilane-bis-hydrogenfluoride $$H_2N-CH_2CH_2-NH-CH_2CH_2-CH_2-SiF_3 \cdot 2HF$$

(Found: 26.2% C; 7.5% H; 11.8% N; 40.2% F; calc.: 26.54% C; 6.68% H; 12.38% N; 41.99% F.)

The substance is difficultly soluble in cold water but can be re-crystallized from boiling water without change in composition (after re-crystallization found 26.0% C; 6.1% H). It is stable to water and acids. Diluted alkaline solutions will decompose it slowly.

Example 2

23 g. γ-amino-propyl-triethoxysilane $$H_2N-CH_2-CH_2-CH_2-Si(OC_2H_5)_3$$

are added drop by drop into a pre-cooled mixture of 28 g. 40% by weight hydrofluoric acid and 28 g. alcohol (ethanol of 96%) which had been vigorously stirred. The so obtained γ-amino-propyl-trifluorosilane-hydrogenfluoride $H_2N-CH_2-CH_2-CH_2-SiF_3 \cdot HF$ undergoes suction filtration, yielding 9.5 g., 58%.

After re-crystallization from water the product obtained had the following composition: 22.2% C; 5.8% H; 46.3% F; calc. for $C_3H_9NSiF_4$: 22.08% C; 5.56% H; 46.58% F. The γ-amino-propyl-trifluorosilane-hydrogenfluoride crystallizes in large colorless crystals.

Example 3

To a solution consisting of 30 g. 40% hydrofluoric acid and 30 g. 96% ethanol, 30 g. γ-triamino-diethylenepropyl-triethoxysilane $$H_2N-(CH_2)_2-NH-(CH_2)_2-NH-(CH_2)_3-Si(OC_2H_5)_3$$

are added drop by drop within 15 minutes while stirring and cooling on ice. The white precipitate which forms is filtered with suction, washed with ethanol and dried over $P_2O_5$. Obtained γ-triamino-diethylene-propyltrifluorosilane-bis-hydrogenfluoride $$H_2N-(CH_2)_2-NH-(CH_2)_2-NH-(CH_2)_3-SiF_3 \cdot 2HF$$

(Found: 26.2% C; 7.5% H; 11.8% N; 40.2% F; calc.: 31.22% C; 7.49% H; 35.27% F. The substance is soluble in boiling water.

While certain embodiments of the invention have been described, it should be understood that the foregoing disclosure relates only to preferred embodiments which are intended to include all changes and modifications of the examples described within the scope of the invention as set forth in the appended claims.

It should be noted that in all examples, percentages by weight have been indicated. Also, it should be understood that the formation of the obtained substances occurs during the drop-by-drop addition of the specified materials.

What we claim is:

1. Amino-organofluorosilicates selected from the group consisting of $NH_2(CH_2)_nSiF_3 \cdot xHF$, $$NH_2(CH_2)_nNH(CH_2)_m-SiF_3 \cdot yHF$$

and $NH_2(CH_2)_nNH(CH_2)_mNH(CH_2)_rSiF_3 \cdot yHF$, wherein $n$, $m$, $r$ are integers from 1–6, $x=1$, and $y=2$.

2. γ-amino-propyl-trifluorosilane-hydrogenfluoride, $$NH_2CH_2CH_2CH_2SiF_3 \cdot HF$$

3. γ-diaminoethylene-propyltrifluorosilane-bis-hydrogenfluoride, $NH_2CH_2CH_2NHCH_2CH_2CH_2SiF_3 \cdot 2HF$.

4. γ-triamino-diethylene-propyltrifluorosilane-bis-hydrogenfluoride, $$NH_2CH_2CH_2NHCH_2CH_2NHCH_2CH_2CH_2SiF_3 \cdot 2HF$$

5. A process for producing the compounds as claimed in claim 1, which comprises reacting amino-organotrifluorosilanes with the stoichiometric amount of hydrofluoric acid, at temperatures ranging from about zero °C. to a temperature of about 90° C.

6. A process for producing the compounds as claimed in claim 1, which comprises reacting amino-organofluorosilanes with an excess amount of hydrofluoric acid, at temperatures ranging from about zero °C. to a temperature of about 90° C.

7. The process as defined in claim 5, wherein the hydrofluoric acid is present in aqueous solution in concentrations of 2–80% by weight.

8. The process as defined in claim 5, wherein the hydrofluoric acid is present in alcoholic solution in concentrations of 2–80% by weight.

9. A process for producing the compounds as claimed in claim 1, which comprises reacting trifunctional aminoalkyl silanes capable of forming amino-alkyltrifluorosilanes with hydrofluoric acid, at temperatures ranging from zero °C. to a temperature of about 90° C., in an excess amount of said acid, said excess being at least 3% by weight over the stoichiometric amount, at an acid concentration of more than 5% by weight.

References Cited

UNITED STATES PATENTS

| 2,557,803 | 6/1951 | Sommer. | |
| 2,580,473 | 1/1952 | Sowa et al. | |
| 2,902,389 | 9/1959 | Keil | 260—448.2 X |
| 2,935,475 | 5/1960 | Bernard | 260—448.2 X |
| 2,972,598 | 2/1961 | Morehouse | 260—448.2 X |

TOBIAS E. LEVOW, Primary Examiner

P. F. SHAVER, Assistant Examiner

UNITED STATES PATENT OFFICE

CERTIFICATE OF CORRECTION

Patent No. 3,458,555                 July 29, 1969

Christian Dathe et al.

It is certified that error appears in the above identified patent and that said Letters Patent are hereby corrected as shown below:

Column 3, line 42, after ".2HF" insert -- :24 g (95%). --; lines 44 and 45, "26.2% C; 7.5% H; 11.8% N; 40.2% F;" should read -- 30.2% C; 7.6% H; 36.1% F; --.

Signed and sealed this 15th day of September 1970.

(SEAL)
Attest:

Edward M. Fletcher, Jr.               WILLIAM E. SCHUYLER, JR.
Attesting Officer                        Commissioner of Patents